United States Patent
Mehlis et al.

(10) Patent No.: US 10,759,268 B2
(45) Date of Patent: Sep. 1, 2020

(54) MANUAL GEARBOX SECTION FOR A VEHICLE, VEHICLE INCLUDING THE MANUAL GEARBOX SECTION, AND METHOD FOR SHIFTING THE MANUAL GEARBOX SECTION

(71) Applicant: Schaeffler Technologies AG & Co. KG, Herzogenaurach (DE)

(72) Inventors: Thomas Mehlis, Kleinsendelbach (DE); Bastian Krueger, Erlangen (DE); Eckhard Kirchner, Erlangen (DE); Andreas Kinigadner, Erlangen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 340 days.

(21) Appl. No.: 15/549,888

(22) PCT Filed: Feb. 18, 2016

(86) PCT No.: PCT/DE2016/200098
§ 371 (c)(1),
(2) Date: Aug. 9, 2017

(87) PCT Pub. No.: WO2016/134713
PCT Pub. Date: Sep. 1, 2016

(65) Prior Publication Data
US 2018/0015818 A1    Jan. 18, 2018

(30) Foreign Application Priority Data
Feb. 23, 2015   (DE) .................. 10 2015 203 194

(51) Int. Cl.
*B60K 6/547*    (2007.10)
*F16H 35/10*    (2006.01)
(Continued)

(52) U.S. Cl.
CPC ............. *B60K 6/547* (2013.01); *B60K 1/00* (2013.01); *B60K 6/383* (2013.01); *B60K 6/387* (2013.01);
(Continued)

(58) Field of Classification Search
CPC ........ B60K 6/365; B60K 6/383; B60K 6/387; B60K 6/547; B60K 17/02; B60K 1/00;
(Continued)

(56) References Cited

U.S. PATENT DOCUMENTS

| | | | |
|---|---|---|---|
| 6,093,128 A | 7/2000 | Seith et al. | |
| 2008/0280726 A1* | 11/2008 | Holmes | B60K 6/387 |
| | | | 477/5 |

(Continued)

FOREIGN PATENT DOCUMENTS

| | | |
|---|---|---|
| AT | 171 474 B | 6/1952 |
| CN | 201588911 U | 9/2010 |

(Continued)

OTHER PUBLICATIONS

International Search Report of PCT/DE2016/200098, 2 pages, dated Jun. 16, 2016.

*Primary Examiner* — Charles A Fox
*Assistant Examiner* — Lori Wu
(74) *Attorney, Agent, or Firm* — Davidson, Davidson & Kappel, LLC

(57) ABSTRACT

A manual gearbox section for a vehicle includes a section input, a section output, a freewheel device situated in a freewheel torque path between the section input and the section output, and a clutch device situated in a clutch torque path between the section input and the section output. The clutch torque path forms a bypass path with respect to the freewheel device and/or the freewheel torque path. The freewheel device is in the form of a rotational-speed-depen- (Continued)

dent freewheel device. The freewheel device is in a freewheeling state at a first rotational speed and in a coupled state at a second rotational speed. The second rotational speed is higher than the first rotational speed.

13 Claims, 6 Drawing Sheets

(51) Int. Cl.
      *F16H 3/54* (2006.01)
      *B60K 1/00* (2006.01)
      *F16D 41/07* (2006.01)
      *F16D 41/08* (2006.01)
      *F16D 47/02* (2006.01)
      *B60K 6/383* (2007.10)
      *B60K 6/387* (2007.10)
      *B60K 17/02* (2006.01)
      *F16D 13/00* (2006.01)
      *F16D 41/00* (2006.01)
      *F16D 41/069* (2006.01)
      *F16D 43/04* (2006.01)
      *F16D 47/04* (2006.01)
      *F16H 3/66* (2006.01)
      *F16D 41/06* (2006.01)
      *F16D 7/00* (2006.01)
      *B60K 6/365* (2007.10)

(52) U.S. Cl.
    CPC .............. *B60K 17/02* (2013.01); *F16D 13/00* (2013.01); *F16D 41/00* (2013.01); *F16D 41/069* (2013.01); *F16D 41/07* (2013.01); *F16D 41/084* (2013.01); *F16D 43/04* (2013.01); *F16D 47/02* (2013.01); *F16D 47/04* (2013.01); *F16H 3/54* (2013.01); *F16H 3/66* (2013.01); *F16H 35/10* (2013.01); *B60K 6/365* (2013.01); *B60K 2001/001* (2013.01); *B60Y 2200/92* (2013.01); *B60Y 2400/424* (2013.01); *B60Y 2400/427* (2013.01); *B60Y 2400/73* (2013.01); *F16D 7/00* (2013.01); *F16D 2041/0603* (2013.01); *F16H 2200/0021* (2013.01); *F16H 2200/0034* (2013.01); *F16H 2200/2005* (2013.01); *F16H 2200/2007* (2013.01); *F16H 2200/2035* (2013.01); *F16H 2200/2066* (2013.01); *F16H 2200/2082* (2013.01); *F16H 2200/2097* (2013.01); *Y10S 903/91* (2013.01); *Y10S 903/913* (2013.01); *Y10S 903/914* (2013.01); *Y10S 903/919* (2013.01)

(58) Field of Classification Search
    CPC ... B60K 2001/001; F16D 47/02; F16D 47/04; F16D 41/00; F16D 41/069; F16D 41/07; F16D 41/084; F16D 43/04; B60Y 2400/424; B60Y 2400/427; B60Y 2400/73
    See application file for complete search history.

(56) References Cited

U.S. PATENT DOCUMENTS

| | | | |
|---|---|---|---|
| 2011/0015021 A1* | 1/2011 | Maguire | B60K 6/365 475/8 |
| 2013/0029804 A1* | 1/2013 | Misala | F16D 27/004 477/5 |
| 2013/0296108 A1* | 11/2013 | Ortmann | B60K 6/383 477/5 |
| 2014/0033844 A1 | 2/2014 | Rothvoss et al. | |
| 2016/0230836 A1* | 8/2016 | Maier | F16D 13/38 |

FOREIGN PATENT DOCUMENTS

| | | |
|---|---|---|
| DE | 102010031745 | 1/2012 |
| DE | 102011122699 | 6/2012 |
| DE | 10 2011 080 454 A1 | 2/2013 |
| DE | 10 2012 216 132 A1 | 3/2014 |
| DE | 10 2012 015 863 A1 | 5/2014 |

\* cited by examiner

MANUAL GEARBOX SECTION FOR A VEHICLE, VEHICLE INCLUDING THE MANUAL GEARBOX SECTION, AND METHOD FOR SHIFTING THE MANUAL GEARBOX SECTION

The present invention relates to a manual gearbox section for a vehicle, including a section input, including a section output, including a freewheel, the freewheel device being situated in a freewheel torque path between the section input and the section output, and including a clutch device, the clutch device being situated in a clutch torque path between the section input and the section output, the clutch torque path forming a bypass path with respect to the freewheel device, and/or the freewheel torque path forming a bypass path with respect to the clutch device. Moreover, the present invention relates to a vehicle that includes the manual gearbox section, and a method for shifting the manual gearbox section.

BACKGROUND

In vehicles, manual gearboxes are used for changing the gear ratio between a traction motor and driven wheels. Shifting the manual gearbox takes place, for example, when the speed of the vehicle increases.

While multigear manual gearboxes are customary for vehicles with internal combustion engines, in manual gearboxes for vehicles with electric motors, variants have instead come into use which include only a small number of gears. Thus, it is quite common for this type of manual gearbox to include only two gears. In addition, in manual gearboxes for vehicles with electric motors, the motor characteristic of the electric motor as a traction motor may be addressed. Due to the motor characteristic, vehicles with electric motors have different criteria for a manual gearbox than vehicles with internal combustion engines, for example.

The publication DE 10 2011 080 454 A1 relates to a vehicle with a hybrid drive. The vehicle includes an internal combustion engine and an electric motor. A gearbox structure is connected between the internal combustion engine and the electric motor, and includes a clutch device and freewheel clutch, which in terms of gearing are situated in parallel to one another. Different drive modes of the vehicle are possible with this gearbox structure.

The publication DE 10 2012 216 132 A1 provides a wheel hub drive for driving a wheel of a motor vehicle, with a drive train that includes an electric drive motor and a gearbox. The gearbox is designed as a manually or automatically shiftable gearbox for torque conversion with at least two gears.

The publication DE 10 2012 015 863 A1 provides a stepped gearbox for a motor vehicle, including a gearbox input that is connectable to a drive motor, and a gearbox output that is connectable to a driven axle of a motor vehicle, the stepped gearbox being designed for providing one first gear and one additional gear. A power transmission from the gearbox input to the gearbox output in the first gear takes place via a first clutch system (freewheel clutch). A power transmission in the additional gear takes place via a second clutch system (powershift clutch).

The publication AT 171 474 B, which constitutes the most proximate prior art, provides a variable-speed gearbox, all the gears of which are automatically shifted by centrifugal clutches, the gearwheels always remaining engaged by use of freewheel clutches. The variable-speed gearbox includes a centrifugal multi-plate clutch, whereby with increasing engine speed, a power flow passes from a main gearbox shaft via the centrifugal multi-plate clutch to a driven shaft. As the engine speed further increases, the power flow passes via a second centrifugal multi-plate clutch, the driven shaft being directly connected to the main gearbox shaft.

SUMMARY OF THE INVENTION

It is an object of the present invention to provide a manual gearbox section for a vehicle which represents an alternative to the prior art.

Within the scope of the present invention, a manual gearbox section is provided which is suitable and/or designed for a vehicle. The vehicle is preferably a road vehicle, in particular a passenger vehicle, truck, bus, etc. The functional task of the manual gearbox section is to provide at least two different transmissions, in particular transmission ratios, in a drive train of the vehicle. The manual gearbox section is particularly preferably designed as a two-gear manual gearbox section that provides exactly two different transmission ratios. The vehicle is preferably designed as an electric vehicle or as a hybrid vehicle, so that the vehicle particularly preferably includes at least one electric motor as a traction motor. In particular, the manual gearbox section is used for conveying a drive torque for the vehicle in order for the vehicle to be able to accelerate to a speed of greater than 50 km/h during operation.

The manual gearbox section includes a section input and a section output. The section input and the section output may be mechanical interfaces or sections. In particular, the section input and/or the section output are/is each designed as a shaft or as a shaft section.

The manual gearbox section includes a freewheel device, the freewheel device being situated in a freewheel torque path between the section input and the section output. The freewheel device may assume at least one freewheeling state and one coupled state, in the coupled state the freewheel torque path being closed by the freewheel device, and in the freewheeling state the freewheel torque path being opened by the freewheel device.

In addition, the manual gearbox section includes a clutch device, the clutch device being situated in a clutch torque path between the section input and the section output. In a general form of the present invention, the clutch device may have an arbitrary design. However, the clutch device is particularly preferably implemented as a frictionally engaged clutch device.

It is provided that the clutch torque path forms a bypass path with respect to the freewheel torque path. It is thus possible for the manual gearbox section, in a first operating state, to conduct a torque from the section input via the clutch device to the section output, the freewheel torque path being open in the freewheel device, and in a second operating state, to conduct the torque from the section input via the freewheel device to the section output, the clutch torque path being open in the clutch device.

Within the scope of the present invention, it is provided that the freewheel device is designed as a speed-dependent freewheel device, at a first speed the freewheel device being in a freewheeling state with respect to a main rotation axis of the freewheel device, and at a second speed the freewheel device being in a coupled state, the second speed being greater than the first speed. The main rotation axis is the rotation axis of the freewheel device.

In other words, the freewheel device is transferred into the coupled state when the speed is above a threshold value between the first and the second speed. In contrast to customary freewheel devices which disengage above a certain speed, the freewheel device according to the present invention engages only above a certain speed. Thus, due to the freewheel device, the freewheel torque path is preferably automatically closed and/or activated above the threshold value and/or at least at the second speed.

The manual gearbox section is thus a semiautomatic, speed-controlled manual gearbox. By using a speed-dependent freewheel device having the described characteristic, it is also possible to dispense with a separate actuator system for opening and closing the freewheel torque path. The number of necessary components in the manual gearbox section may thus be kept low. As a result, the weight of the manual gearbox section is low, and/or the manufacturing costs are low. It is particularly advantageous that the change from the clutch torque path to the freewheel torque path may be carried out without interruption of traction.

In one preferred implementation of the present invention, the manual gearbox section may assume the first operating state, in which the clutch device is in an engaged state and the freewheel device is in a freewheeling state. In addition, the manual gearbox section may assume the second operating state, in which the clutch device is in a disengaged state and the freewheel device is in a coupled state.

The transmissions, in particular the transmission ratios, of the freewheel torque path and of the clutch torque path are particularly preferably different, so that the change in the operating states at the same time results in a change in the transmissions, in particular the transmission ratios. The first operating state particularly preferably corresponds to a first gear, and the second operating state corresponds to a second gear. The first operating state and/or the first gear are/is used for lower speeds of the vehicle, and the second operating state and/or the second gear are/is used for higher speeds of the vehicle.

It is particularly preferably provided that the freewheel device is designed as a centrifugal clutch. As a result of the design as a centrifugal clutch, due to the rotation of the freewheel device it automatically transfers from the freewheeling state into the coupled state when, on account of the transition from the first rotational speed to the second rotational speed and/or on account of the exceedance of the threshold value, the centrifugal forces acting outwardly are great enough to implement the change of state of the freewheel device.

In the present invention it is preferred that the freewheel device is designed as an overrunning clutch. It is thus possible, even in the coupled state of the freewheel device, for the section output to rotate faster than the section input.

However, the freewheel device is particularly preferably designed as a freewheel device that acts or couples in only one rotation direction. The coupled state thus takes place in a coupling rotation direction, whereas a freewheeling state is always present in a rotation direction opposite to the coupling rotation direction.

In one preferred implementation of the present invention, the freewheel device is designed as a sprag clutch that includes a plurality of clamping bodies. The clamping bodies are situated in such a way that, during the transition from the first rotational speed to the second rotational speed and/or when the threshold value is exceeded due to the radially outwardly acting centrifugal forces, the clamping bodies are displaced, in particular pivoted, and rotatably fixedly connect the section input and the section output to one another.

In one particularly preferred refinement of the present invention, the clamping bodies are rotatably fixedly coupled to the freewheel output in relation to a rotation about the main rotation axis. This means that in order to activate the freewheel device and/or to transfer into the coupled state, the section output must change from the first rotational speed to the second rotational speed, or must exceed the limiting value. In contrast, the rotational speed of the section input in the freewheeling state is irrelevant for the state of the freewheel device. This design is based on the consideration that during shifting of the manual gearbox section from the first operating state into the second operating state, the rotational speed of the section output is further increased, since it is proportional to the travel speed of the vehicle. In contrast, the rotational speed of the section input is reduced due to the changing transmission ratio. Thus, only the section output provides a reliable input variable for controlling the rotational speed-dependent freewheel device. Reliable switching of the states of the freewheel device thus takes place due to the coupling of the clamping bodies to the section output.

In one particularly preferred embodiment of the present invention, the manual gearbox section includes an actuator system for actuating the clutch device, in particular for transferring from the closed state into the open state and/or from the open state into the closed state. The actuator system may be designed as an electrical actuator system, or alternatively as a hydraulic or pneumatic actuator system.

In addition, the manual gearbox section, in particular the freewheel device, includes a locking device that is designed for detachably locking the freewheeling state of the freewheel device. It is particularly preferably provided that the actuator system actuates the clutch device and the locking device at the same time. In this way, the manual gearbox section may be shifted in a particularly reliable manner with only one actuator system. Thus, as the result of actuating the actuator system, during the transition from the first operating state to the second operating state the clutch device is disengaged, and at the same time, locking of the freewheel device is discontinued. In the opposite direction, the clutch device is engaged, and at the same time the freewheel device is locked.

It is preferred that the manual gearbox section includes at least one friction clutch device that is situated in the freewheel torque path. The friction clutch device is designed to slip above a threshold value for a torque, and to engage only below the threshold value for the torque, in such a way that both sides of the friction clutch device have the same rotational speed. It has been recognized that when the freewheel device transfers from the freewheeling state into the coupled state, a brief, steep increase in torque may occur due to the adaptation of different rotational speeds of the section input and of the section output. This increase in torque may be filtered out with the friction clutch device, so that the driving comfort may be increased with the manual gearbox section.

It is particularly preferred that a gear is integrated into the clutch torque path, as the result of which the transmissions, in particular the gear ratios, are different in the clutch torque path and in the freewheel torque path. It is preferably provided that a 1:1 transmission ratio is formed in the freewheel torque path, so that additional components may be dispensed with here.

A further subject matter of the present invention relates to a vehicle that includes at least one electric motor, in particular as a traction motor. As explained above, the vehicle is particularly preferably designed as an electric vehicle or as a hybrid vehicle. The vehicle includes the manual gearbox section as described above, or according to one of the preceding operations. In particular, the manual gearbox section forms a two-gear manual gearbox in the vehicle.

A further subject matter of the present invention relates to a method for shifting the manual gearbox section and/or the vehicle which includes the manual gearbox section, as previously described. It is provided that the manual gearbox section changes the clutch device from the engaged state into the disengaged state and changes the freewheel device from the freewheeling state into the coupled state, during or after a transition from the first rotational speed to the second rotational speed and/or during or after the exceedance of the threshold value.

BRIEF DESCRIPTION OF THE DRAWINGS

Further features, advantages, and effects of the present invention result from the following description of one preferred exemplary embodiment of the present invention and the appended figures.

FIG. 5 shows the cross section in the implementation of FIG. 4a; and

DETAILED DESCRIPTION

Figure 1:
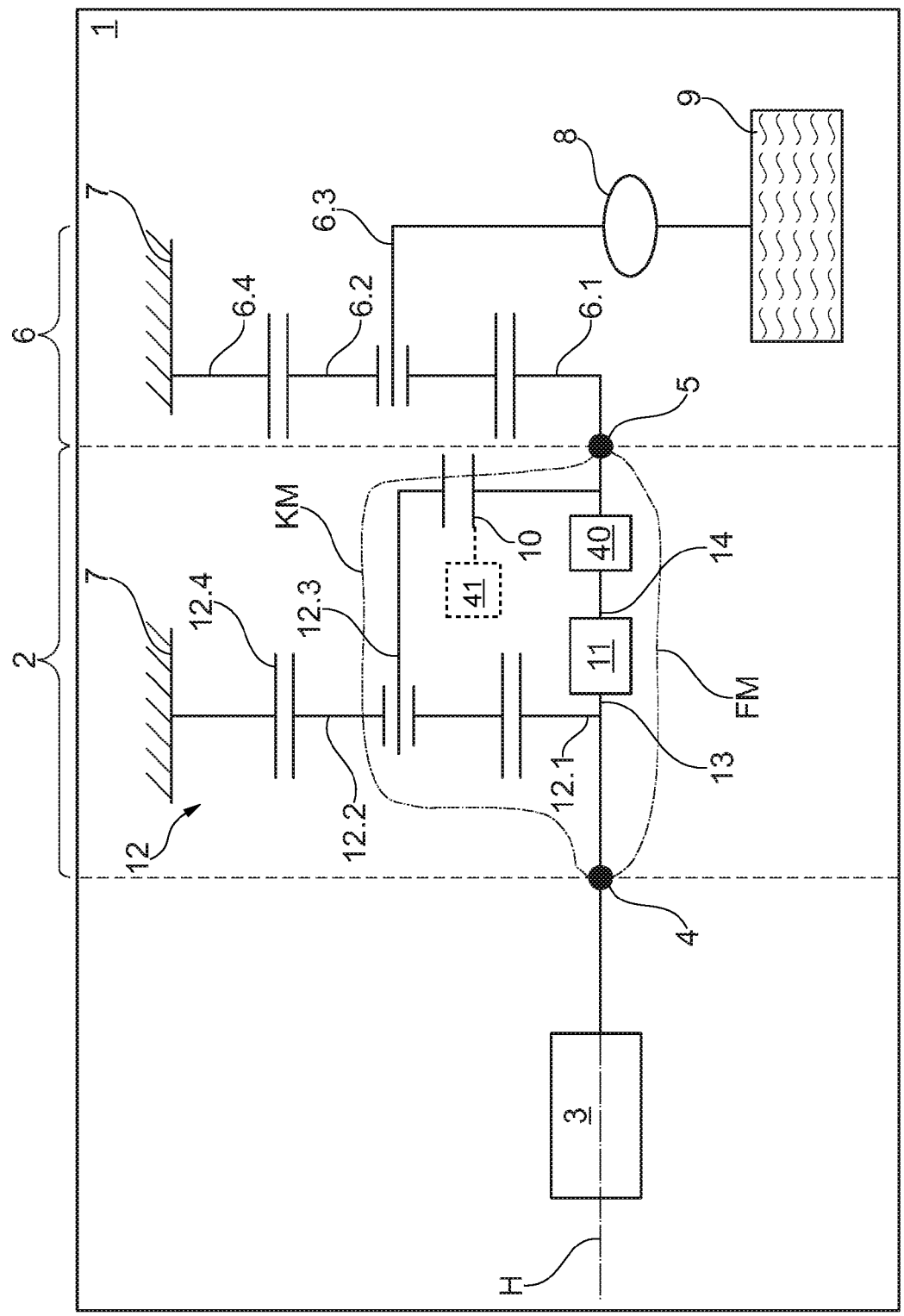
FIG. 1 shows a schematic diagram of a manual gearbox section in a vehicle as one exemplary embodiment of the present invention.

FIG. 1 shows a highly schematic diagram of a vehicle 1 that includes a manual gearbox section 2 as a first exemplary embodiment of the present invention. Vehicle 1 is a passenger vehicle, for example, and is illustrated only in highly schematic form as a block. Vehicle 1 includes an electric motor 3 that is designed as a traction motor and used for driving vehicle 1. In particular, electric motor 3 is designed, in terms of power, in such a way that vehicle 1 may be accelerated to speeds of greater than 50 km/h by the drive torque of electric motor 3. Vehicle 1 may optionally also include an internal combustion engine, so that it is designed as a hybrid vehicle. FIG. 1 shows an electric vehicle without an internal combustion engine as one exemplary embodiment.

Manual gearbox section 2 includes a section input 4 and a section output 5. Section input 4 is rotatably fixedly connected to a rotor of electric motor 3. Even further gearbox components may optionally also be situated between section input 4 and electric motor 3.

In the exemplary embodiment shown, section output 5 is operatively connected to a further gear 6, further gear 6 representing a speed step-up, in the present exemplary embodiment, a speed reducer. Further gear 6 is designed as a planetary gear, section output 5 being rotatably fixedly connected to a sun wheel 6.1. Sun wheel 6.1 meshes with multiple planet wheels 6.2 that are rotatably supported on a planet-wheel carrier 6.3. Planet wheels 6.2 in turn mesh with an annulus gear 6.4 that is stationarily situated with respect to a surrounding structure 7, in particular a housing. Sun wheel 6.1 thus forms an input into further gear 6, and planet-wheel carrier 6.3 forms an output from further gear 6.

In the present exemplary embodiment, planet-wheel carrier 6.3 and/or the output of further gear 6 are/is operatively connected to a differential unit 8 which distributes an applied drive torque to two wheels 9 of vehicle 1, only one wheel 9 being illustrated in the drawing. Instead of a differential unit 8 that is designed as a transverse differential unit, a longitudinal differential unit may also be used.

Manual gearbox section 2 is designed as a two-gear powershift stage for the vehicle drive of vehicle 1. Manual gearbox section 2 provides two different gears via a first and a second operating state B1, B2, respectively, as explained in greater detail below.

In particular, two different torque paths from section input 4 to section output 5 may be implemented by manual gearbox section 2, the drive torque of electric motor 3, optionally transmitted from section input 4 to section output 5, being conducted via the torque paths. A first torque path, designed as a clutch torque path KM, extends, starting from section input 4, via a clutch device 10 to section output 5. In contrast, a freewheel torque path FM extends from section input 4 via a freewheel device 11 to section output 5. A view of torque paths KM, FM shows that clutch device 10 and freewheel device 11 are situated in parallel to one another or in parallel path segments. In particular, clutch torque path KM forms a bypass path with respect to freewheel torque path FM. In a different illustration, it could also be stated that freewheel torque path FM forms a bypass path with respect to clutch torque path KM.

In addition, a gear 12 is provided in clutch torque path KM. Gear 12 may in principle have an arbitrary design. In the exemplary embodiment, gear 12, the same as further gear 6, is designed as a planet wheel gear, in particular as a spur gear-planet wheel gear. Section input 4 is rotatably fixedly coupled to a sun wheel 12.1. In particular, sun wheel 12.1 is situated coaxially with respect to section input 4. Sun wheel 12.1 meshes with a plurality of planet wheels 12.2 whose rotation axes, offset in parallel, are situated on a shared partial circle diameter so as to be rotatable about main rotation axis H defined by section input 4 and/or the rotation axis of freewheel device 11. Planet wheels 12.2 rest on a planet-wheel carrier 12.3. Planet wheels 12.2 mesh on the one hand with sun wheel 12.1, and on the other hand with an annulus gear 12.4 that is stationarily situated on surrounding structure 7, in particular on the housing. Sun wheel 12.1 thus forms an input into gear 12, and planet-wheel carrier 12.3 forms an output from gear 12. Planet-wheel carrier 12.3, as an output, is connected to an input side of clutch device 10. In contrast, an output side of clutch device 10 is rotatably fixedly connected to section output 5.

For the case that clutch device 10 is engaged and thus in a closed state, clutch torque path KM extends from section input 4 via sun wheel 12.1, planet wheels 12.2, planet-wheel carrier 12.3 via clutch device 10, to section output 5.

In particular, gear 12 is used for implementing a speed step-up, in the present case a speed reduction, so that, starting from a high rotational speed at section input 4, a lower rotational speed is output at section output 5. Clutch torque path KM thus implements a first gear in vehicle 1.

In contrast, freewheel device 11 is rotatably fixedly connected to section input 4 via a freewheel input 13, and is rotatably fixedly connected to section output 5 via a freewheel output 14. Freewheel device 11 may assume a freewheeling state in which freewheel torque path FM is then disconnected in freewheel device 11, and may assume a coupled state in which freewheel torque path FM is closed by freewheel device 11 and also closed between section input 4 and section output 5. Freewheel torque path FM forms a 1:1 transmission ratio, so that an input rotational speed at section input 4 corresponds to the output rotational speed at section output 5. The freewheel torque path thus implements a second gear in manual gearbox section 2 of vehicle 1, designed as a two-gear powershift stage.

Freewheel device 11 is designed as a rotational speed-dependent freewheel device which changes from the freewheeling state into the coupled state above a threshold value for the rotational speed. Freewheel device 11 changes from the freewheeling state into the coupled state when the threshold value is exceeded, i.e., during a transition from a first rotational speed to a second rotational speed, the second rotational speed being greater than the first rotational speed. In other words, the coupled state is assumed by freewheel device 11 when the rotational speed of freewheel device 11 has exceeded the threshold value. Freewheel torque path FM is thus closed when the rotational speed exceeds a certain threshold value.

In the exemplary embodiment in FIG. 1, it is provided that the relevant component for the rotational speed is freewheel output 14. Freewheel output 14 is continuously coupled to the output, so that the state-determining rotational speed is in a fixed ratio with the rotational speed at wheels 9 of vehicle 1.

Briefly summarized, the mode of operation of manual gearbox section 2 is as follows:

When vehicle 1 is started, the rotational speed at wheels 9 and thus at freewheel output 14 is initially low, so that freewheel device 11 is in the freewheeling state. In contrast, clutch device 10 is engaged via an actuator system 41 so that clutch torque path KM is closed. Manual gearbox section 2 is in first operating state B1, so that the first gear is implemented.

When the speed increases, the rotational speed at section output 5 and thus at freewheel output 14 increases at the same time. Above a threshold value, clutch device 10 is disengaged by the actuator system 41 and at the same time freewheel device 11 is engaged, so that it is transferred into the coupled state. Freewheel torque path FM is thus closed, so that gearbox section 2 is in second operating state B2 and thus implements a second gear for higher speeds. A change in the transmission ratio is implemented in conjunction with the change from clutch torque path KM to freewheel torque path FM.

The manual gearbox section optionally also includes a friction clutch device 40, friction clutch device 40 being situated in the freewheel torque path. Friction clutch device 40 is used for disengaging and/or slipping above a limiting value of an applied torque, and for engaging below the limiting value. The mode of operation of friction clutch device 40 is explained below.

The transition from first operating state B1 into second operating state B2, with reference to different parameters, is illustrated in a highly schematic manner in FIGS. 2a through 2d. The X axis is the same in all the graphs, and may represent a time axis, for example, while the Y axis is different.

Figure 2A:
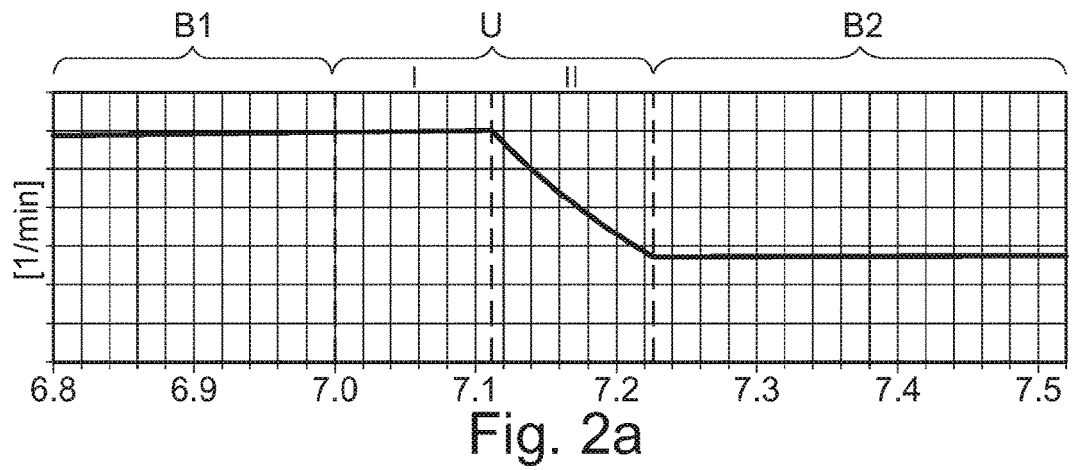
FIGS. 2a through 2d show diagrams for illustrating the method for shifting the manual gearbox section.
Figure 2B:
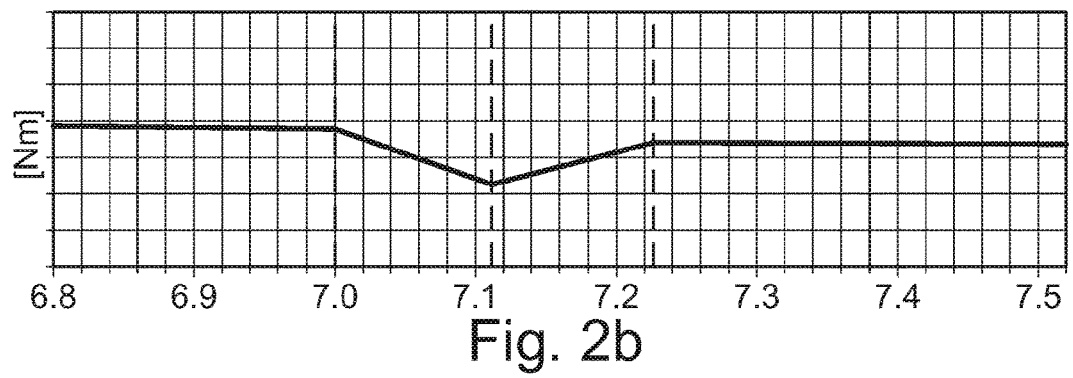
Figure 2C:
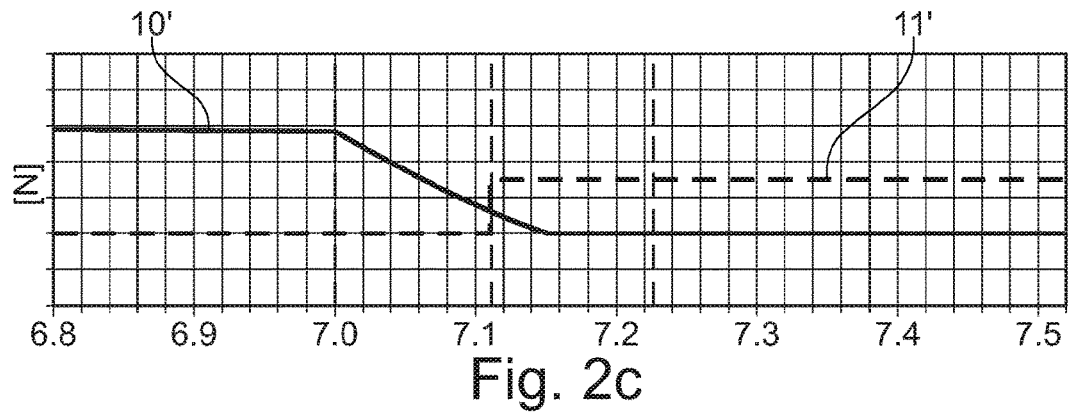

In FIG. 2a, the Y axis shows the rotational speed at section input 4. FIG. 2b illustrates the drive torque at section output 5 or at differential unit 8. FIG. 2c illustrates the contact force in clutch device 10, denoted by reference numeral 10', as well as the clamping force in freewheel device 11, denoted by reference numeral 11'.

Figure 2D:
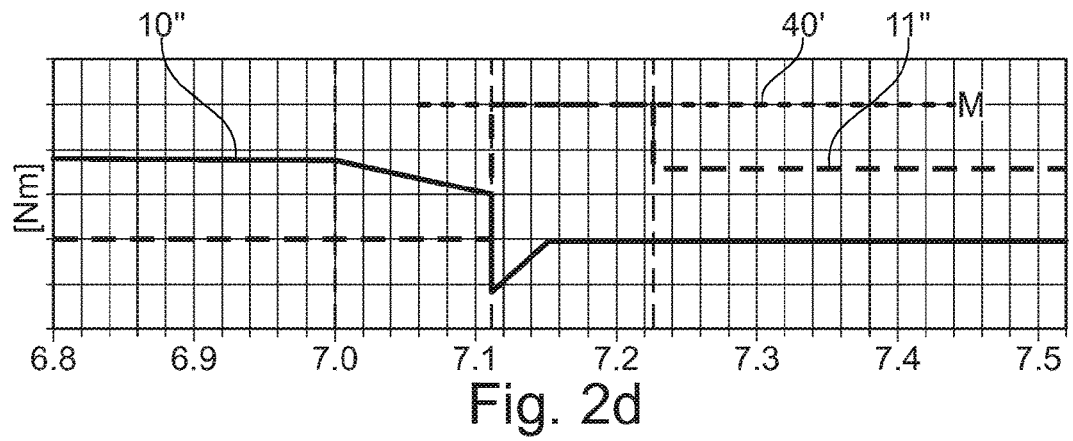

FIG. 2d illustrates the transmitted torque of clutch device 10, denoted by reference numeral 10", and of freewheel device 11, denoted by reference numeral 11", and a torque limitation by a friction clutch device, denoted by reference numeral 40'.

In the figures, in each case an area of the X axis is associated with first operating state B1, with a transition state U having a first phase I and a second phase II, and with second operating state B2.

It is apparent in FIG. 2a that the rotational speed of electric motor 3 slowly increases in operating state B1. As a result, the speed of vehicle 1 slowly increases. In transition state U1, the rotational speed of electric motor 3 further increases in first phase I, while it then becomes lower in second phase II, and in second operating state B2 is then lower than the rotational speed in first operating state B1. In first operating state B1, the first gear is engaged via clutch torque path KM, and in second operating state B2 the second gear is then engaged via freewheel torque path FM.

FIG. 2b illustrates the torque curve at freewheel output 14 or section output 5, and at the output of further gear 6. It is apparent here that the torque in first operating state B1 slowly attenuates due to the motor characteristic. In transition state U, the torque is reduced down to a minimum in first phase I, and then in second phase II once again increases until it reaches an output level in second operating state B2. The torque is greater than 0 in each operating state, so that the transition is carried out without interruption of traction.

Whether the output level of the torque in operating state B2 is lower, higher, or the same as the torque in first operating state B1 depends on the design of the transmission ratio and the motor characteristic of electric motor 3, and may be coordinated via these variables.

FIG. 2c illustrates the contact force of clutch device 10 as line 10', and of freewheel device 11 as line 11'. It is apparent that contact force 10' is reduced at the boundary between first operating state B1 and transition state U. Clutch device 10 is slowly disengaged here by the actuator system 41. As a result, the torque that is transmittable to the axle according to FIG. 2c is slowly and/or continuously reduced. In contrast, freewheel device 11 is still completely disengaged in first phase I. Freewheel device 11 is transferred from the freewheeling state into the coupled state at the boundary between first phase I and second phase II. As a result, the contact force abruptly increases at freewheel device 11 according to curve 11'. This behavior may also be referred to as "digital." In contrast, clutch device 10 is further disengaged at the start of second phase II, so that contact force 10' is further reduced, and decreases to zero in the middle of second phase II. The torque path changes from clutch torque path KM to freewheel torque path FM.

Lastly, FIG. 2d shows the transmitted torques. Curve 10" shows the torque that is transmitted by clutch device 10. This torque is slowly reduced in first operating state B1, and a further reduction takes place in first phase I. Freewheel device 11 is abruptly engaged at the boundary between first phase I and second phase II. In this state, clutch device 10 acts as a type of brake due to the torque paths acting in parallel, so that the torque transmitted by clutch device 10 becomes less than zero. In contrast, at the boundary between first phase I and second phase II the torque transmitted by freewheel device 11 increases in steps or digitally to a maximum value M, which is limited by friction clutch device 40. Friction clutch device 40 is active until more quickly rotating freewheel input 13 has adapted, with regard to rotational speed, to more slowly rotating freewheel output 14. The transition to second operating state B2 has then taken place.

The actuation of clutch device 10 and of a locking device 26 (see FIGS. 4a, 4b) of freewheel device 11 may take place via a shared actuator system 41, so that only a single actuator system is needed for the switching operation shown in FIG. 2d.

It may be provided in particular that freewheel device 11, in principle, could be ready to change from the freewheeling state into the coupled state with regard to rotational speed, even before locking device 26 is released; however, this would be delayed by locking device 26. Only when locking device 26 is actuated by the shared actuator system 41 or optionally by some other actuator system is freewheel device 11 enabled, and able to change from the freewheeling state into the coupled state.

In other words, the shifting operation takes place as follows:

The shifting operation is initiated by clutch device 10 being continuously disengaged. The transmittable torque drops corresponding to the curve of the contact force in clutch device 10 according to curve 10'. Second phase II begins as soon as freewheel device 11 engages. The transfer of torque in freewheel device 11 takes place digitally, as the result of which the rotational speed of electric motor 3 is immediately adapted to the transmission ratio of the second gear. Thus, despite this jump in the torque balance, comfort is not adversely affected; this requires a slip element, designed as friction clutch device 40, in freewheel device 11 in the second gear, which filters out the load peaks and thus allows a comfortable shifting operation. However, there are limits to this filtering of the load peaks, since freewheel device 11 must be able to transmit the engine torque with appropriate reliability during driving operation. Thus, the torque of electric motor 3 must be additionally adapted in order to be able to completely compensate for the dynamic torque during the rotational speed adaptation of electric motor 3. The rotational speed of electric motor 3 is adapted to the transmission ratio in the second gear at the end of second phase II. The dynamic torque is thus not applicable, and the torque of electric motor 3 may once again be adapted.

Figure 3:
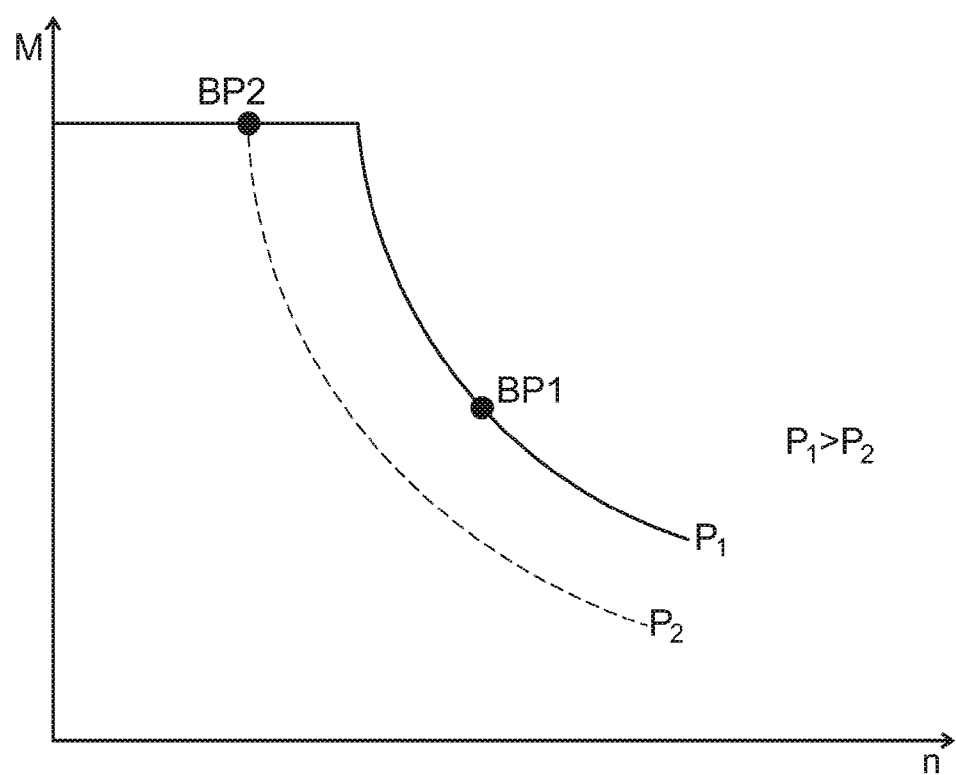
FIG. 3 shows another diagram for illustrating the method.

A view of operating points BP1 and BP2 of electric motor 3 in FIG. 3 before and after shifting shows that, in the case of the shifting described in FIGS. 2a through 2d, the motor rotational speed drops to the boundary of the base rotational speed range. The electric machine is thus able to deliver only slightly less power P2 after the shifting than power P1 before the shifting operation. For this reason, the axle torque after the shifting is at a lower level than before the shifting. Optionally, the shift point could also be moved back so that both point BP1 and point BP2 are on the power hyperbola of P1. Consequently, the axle torque before and after the shifting would be at the same level.

Figure 4A:
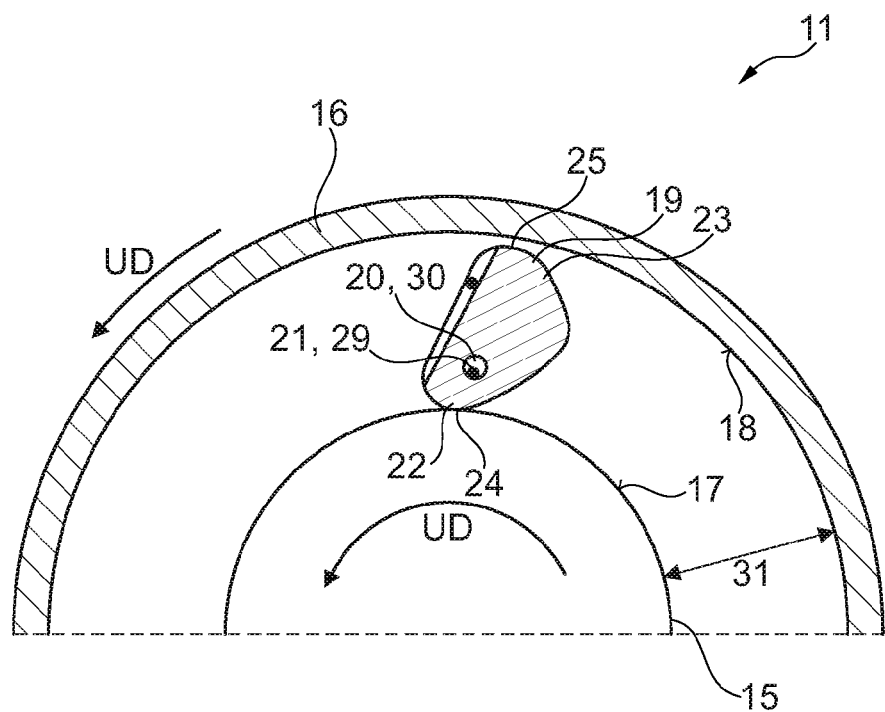
FIGS. 4a, 4b show a cross section and a longitudinal section of a freewheel device of the manual gearbox section.

FIG. 4a shows freewheel device 11 in a schematic cross section perpendicular to main rotation axis H.

Freewheel device 11 includes an output wheel 15 which is situated coaxially with respect to main rotation axis H and which is rotatably fixedly connected to freewheel output 14. In addition, freewheel device 11 includes an input wheel 16 which is rotatably fixedly connected to freewheel input 13. Input wheel 16 is situated coaxially and concentrically with respect to output wheel 15.

Figure 4B:
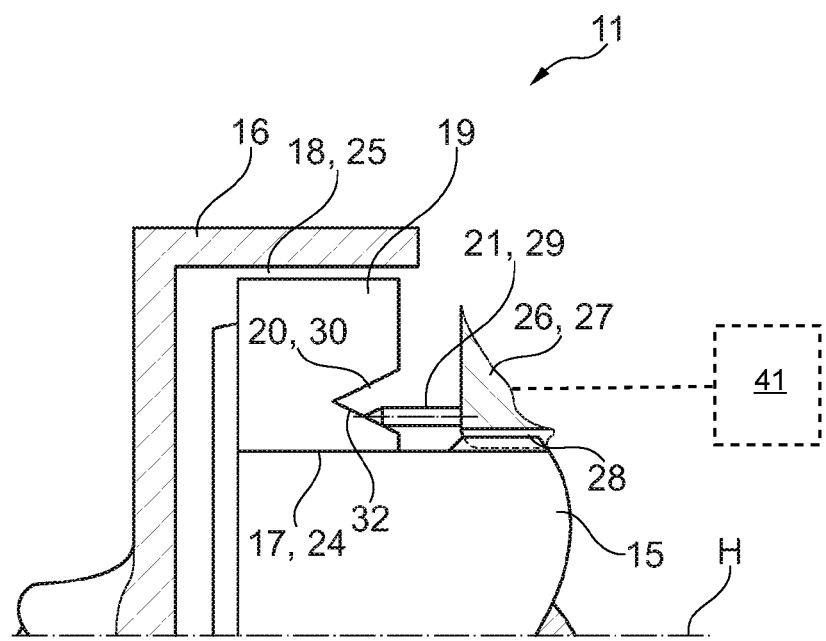

As is apparent in particular from FIG. 4b, which shows a longitudinal section of freewheel device 11, input wheel 16 is designed as an annulus wheel and output wheel 15 is designed as an inner wheel, output wheel 15 being situated radially inwardly with respect to input wheel 16. Output wheel 15 has an output shell surface 17 along the entire circumference or at least in sections, whereas input wheel 16 has a radially inwardly facing input shell surface 18 having a cylindrical shell shape. A diameter of output shell surface 17 is smaller than a diameter of input shell surface 18. A plurality of clamping bodies 19 is situated between output wheel 15 and input wheel 16, and in particular between output shell surface 17 and input shell surface 18, only one clamping body 19 being illustrated in each case in the figures.

Clamping bodies 19 are designed as nonrotationally symmetrical bodies in the axial top view as shown in FIG. 4a. Clamping body 19 has a pivot section 20, so that clamping body 19 may pivot about a pivot area 21, whereby pivot area 21 is axially oriented but offset radially outwardly with respect to main rotation axis H.

Clamping body 19 or all clamping bodies 19 is/are fixedly connected to output wheel 15 in the circumferential direction so as to be rotatable about main rotation axis H. This is achieved in that pivot area 21 is rotatably fixedly coupled to output wheel 15.

Clamping body 19 has an eccentric design in the cross section shown in FIG. 4a, so that a smaller first subsection 22 and a larger second subsection 23 are formed with respect to pivot section 20. The eccentricity of clamping body 19 or the positioning of pivot section 20 is selected in such a way that when output wheel 15 rotates about main rotation axis H in a transmission rotation direction UD, clamping body 19 is pivoted about pivot area 21 due to the centrifugal force, so that a first contact section 24 rests against output wheel 15, and a second contact section 25 rests against input wheel 16.

During operation, a drive torque is introduced in transmission rotation direction UD by electric motor 3 via input wheel 16, so that clamping body 19 is carried further along via second contact section 25, thus forming a clamping connection between input wheel 16 and output wheel 15.

However, freewheel device 11 at the same time forms an overrunning clutch, since when output wheel 15 rotates faster in transmission rotation direction UD than input wheel 16, output wheel 15 may overrun input wheel 16. Thus, for example, it is not possible to implement an engine brake via freewheel device 11.

For controlling freewheel device 11, it includes a locking device 26 which is designed as a sliding sleeve 27 and which may be moved in the axial direction via a sliding seat 28. Sliding sleeve 27 has a pivot finger section 29 that forms pivot area 21 and is oriented in the axial direction. With pivot finger section 29, sliding sleeve 27 engages with a pivot section 20 designed as a through opening 30. Pivot finger section 29 may also be stationarily situated on output wheel 15. Through opening 30 is significantly oversized compared to pivot finger section 29 with respect to the free diameter, so that the position of pivot finger section 29 in through opening 30 may be freely adjusted.

Figure 5:
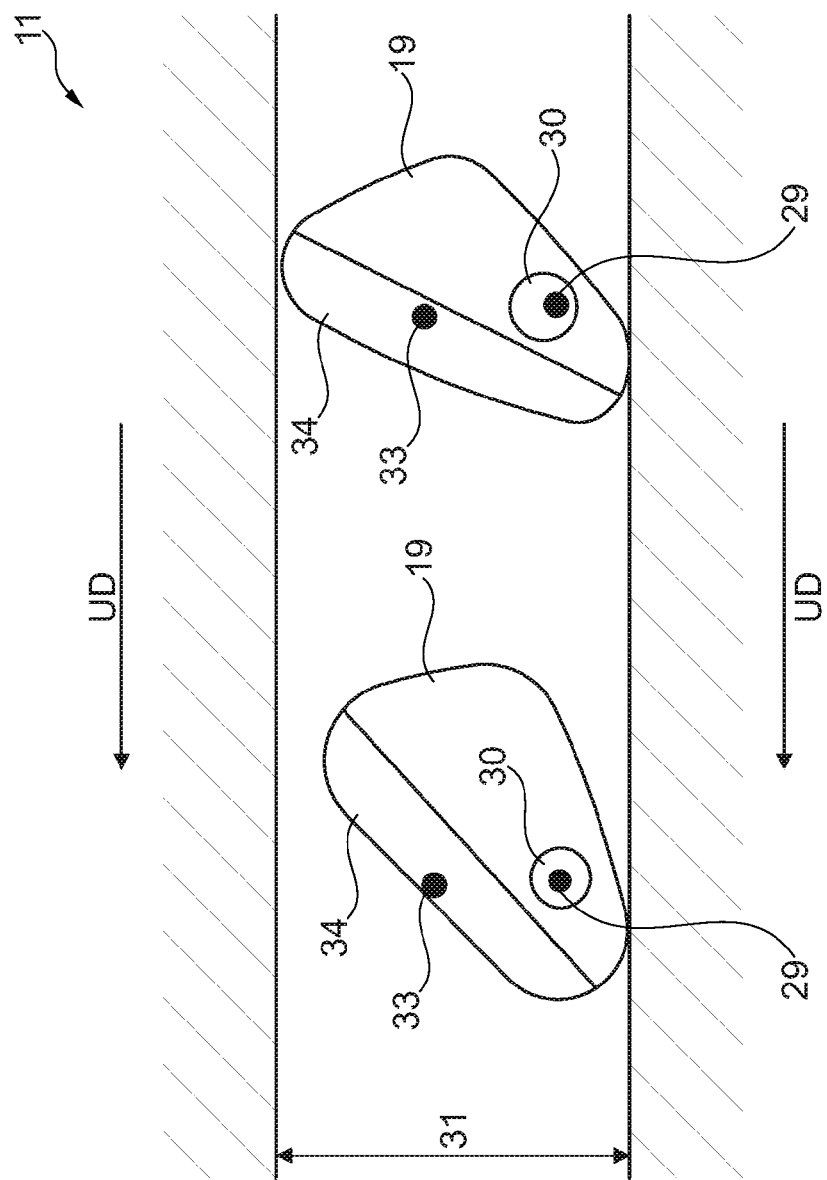

The free adjustment is illustrated in FIG. 5, showing annular gap section 31, situated between output wheel 15 and input wheel 16, in an implementation with two clamping bodies 19 in two different states. Left clamping body 19 is in a first pivot position, with freewheel device 11 in the freewheeling state. Pivot finger section 29 may, for example, be centrally situated in through opening 30. During the transition into the coupled state, clamping body 19 assumes a second pivot position, as shown for right clamping body 19. In this state, pivot finger section 29 may be eccentrically offset, so that clamping body 19 may be freely adjusted.

For the case that pivot finger section 29 is situated on sliding sleeve 27 as shown in this exemplary embodiment, it is advantageous to introduce a bevel 32 at the entrance of through opening 30.

Figure 6A:
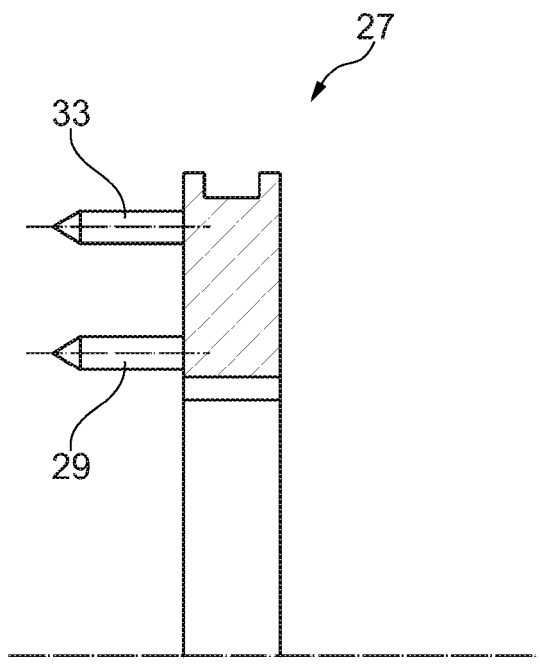
FIGS. 6a, 6b, 6c show a sliding sleeve and a clamping body of the freewheel device.

As is apparent from FIG. 6a, which shows a longitudinal section of sliding sleeve 27, sliding sleeve 27, in addition to pivot finger section 29, has a securing finger section 33 situated in parallel thereto and further radially outwardly. Securing finger section 33 cooperates with a guide surface 34 on clamping body 19, which is oriented at an angle in such a way that when sliding sleeve 27 is axially aligned, securing finger section 33 may slide along guide surface 34 and thus transfer clamping body 19 from the second pivot position into the first pivot position.

Locking device 26 may thus optionally transfer clamping body 19 from the second pivot position into the first pivot position. In any case, locking device 26 may lock clamping body 19 or all clamping bodies 19 in the first pivot position, thus ruling out inadvertent transfer of freewheel device 11 from the freewheeling state into the coupled state.

Figure 6B:
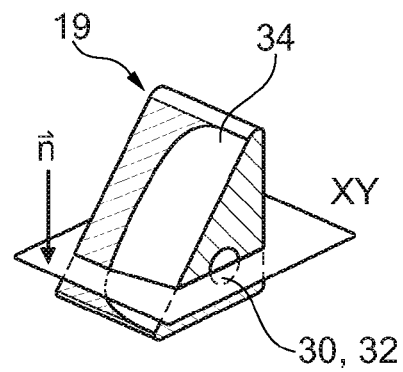
Figure 6C:
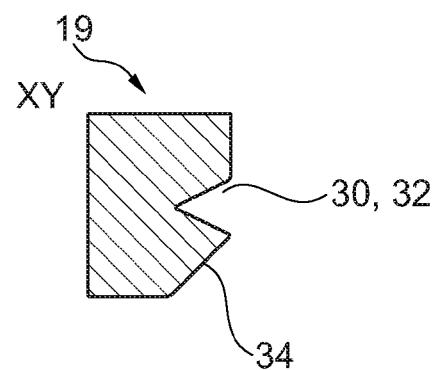

FIGS. 6b and 6c show clamping body 19 in a schematic three-dimensional illustration and in a sectional illustration along surface XY, guide surface 34 once again being clearly depicted. Guide surface 34 is inclined with respect to a radial plane of main rotation axis H in the alignment direction of sliding sleeve 27, so that in an axial alignment, securing finger section 33 descends the slope as a height profile, thus pivoting clamping body 19 about pivot section 20 and/or pivot finger section 29 in the direction of the first pivot position.

LIST OF REFERENCE NUMERALS 1 vehicle
2 manual gearbox section
3 electric motor
4 section input
5 section output
6 further gear
6.1 sun wheel
6.2 planet wheels
6.3 planet-wheel carrier
6.4 annulus gear
7 surrounding structure (housing)
8 differential unit
9 wheels
10 clutch device
11 freewheel device
12 gear
12.1 sun wheel
12.2 planet wheels
12.3 planet-wheel carrier
12.4 annulus gear
13 freewheel input
14 freewheel output
15 output wheel
16 input wheel
17 output shell surface
18 input shell surface
19 clamping body
20 pivot section
21 pivot area
22 first subsection
23 second subsection
24 first or inner contact section
25 second or outer contact section
26 locking device
27 sliding sleeve
28 sliding seat
29 pivot finger section
30 through opening
31 annular gap section
32 bevel
33 securing finger section
34 guide surface
40 friction clutch device
41 actuator system
B1 first operating state
B2 second operating state
G2 lower power
H main rotation axis
FM freewheel torque path
KM clutch torque path
P1 power 1
P2 power 2
PB1 first operating point
PB2 second operating point
U1 transition state
UD transmission rotation direction

What is claimed is:

1. A manual gearbox section for a vehicle comprising:
a section input;
a section output;
a freewheel device situated in a freewheel torque path between the section input and the section output;
a clutch device situated in a clutch torque path between the section input and the section output, the clutch torque path forming a bypass path with respect to the freewheel device and the freewheel device forming a bypass path with respect to the clutch device, the freewheel device being configured as a rotational speed-dependent freewheel device, the freewheel device being in a freewheeling state at a first rotational speed and being in a coupled state at a second rotational speed, the second rotational speed being higher than the first rotational speed,
wherein the manual gearbox section is configured to assume a first operating state, in which the clutch device is in an engaged state and the freewheel device is in the freewheeling state, and configured to assume a second operating state, in which the clutch device is in a disengaged state and the freewheel device is in a coupled state,
wherein the clutch device is a frictionally engaged clutch device, the first operating state corresponding to a first gear and the second operating state corresponding to a second gear, in the first operating state the manual gearbox section conducting a torque from the section input via the clutch device to the section output and the freewheel torque path in the freewheel device being open, in the second operating state the manual gearbox section conducting the torque from the section input via the freewheel device to the section output and the clutch torque path in the clutch device being open; and
an actuator system configured to, during a transition state between the first operating state and the second operating state, transfer the freewheel device from the freewheeling state into the coupled state and simultaneously gradually reduce a contact force of the clutch device.

2. The manual gearbox section as recited in claim 1, wherein the freewheel device is configured as a centrifugal clutch and/or as an overrunning clutch.

3. The manual gearbox section as recited in claim 1, wherein the freewheel device includes a freewheel output, the freewheel device configured for changing from the freewheeling state into the coupled state and/or from the coupled state into the freewheeling state as a function of a rotational speed of the freewheel output.

4. The manual gearbox section as recited in claim 3, wherein the freewheel device is configured as a sprag clutch, the sprag clutch including a plurality of clamping bodies, the clamping bodies being rotatably fixedly coupled to the freewheel output and/or to the section output.

5. The manual gearbox section as recited in claim 1 further comprising a sliding sleeve for locking the freewheeling state of the freewheel device, the actuator system configured to actuate the clutch device and the sliding sleeve at a same time.

6. The manual gearbox section as recited in claim 1 further comprising a friction clutch device is situated in the freewheel torque path.

7. The manual gearbox section as recited in claim 1 further comprising includes a gear situated in the clutch torque path.

8. A vehicle comprising:
at least one electric motor; and
the manual gearbox section as recited in claim 1 connected to the at least one electric motor.

9. A method for shifting the manual gearbox section as recited in claim 1, the method comprising:
during or after a transition from the first rotational speed to the second rotational speed, changing the clutch device from an engaged state into a disengaged state, and changing the freewheel device from the freewheeling state into the coupled state.

10. A manual gearbox section for a vehicle comprising:
a section input;
a section output;
a freewheel device situated in a freewheel torque path between the section input and the section output;
a clutch device situated in a clutch torque path between the section input and the section output, the clutch torque path forming a bypass path with respect to the freewheel device and the freewheel device forming a bypass path with respect to the clutch device, the freewheel device being configured as a rotational speed-dependent freewheel device, the freewheel device being in a freewheeling state at a first rotational speed and being in a coupled state at a second rotational speed, the second rotational speed being higher than the first rotational speed;
at least one actuator system configured for actuating the freewheel device into the coupled state while disengaging the clutch device such that the freewheel device enters into the coupled state prior to the clutch device being fully disengaged; and
a friction clutch device between a freewheel output of the freewheel device and the section output configured for limiting a torque transmitted by the freewheel device until a freewheel input of the freewheel device adapts, with regard to rotational speed, to the freewheel output of the freewheel device.

11. The manual gearbox section as recited in claim 10 wherein the manual gearbox section is configured such that the clutch device acts as a brake immediately after the freewheel device enters the coupled state.

12. The manual gearbox section as recited in claim 10 wherein the freewheel device is configured such that a torque transmitted by the freewheel device increases in steps or digitally to a maximum value when the freewheel device enters into the coupled state.

13. A manual gearbox section for a vehicle comprising:
a section input;
a section output;
a freewheel device situated in a freewheel torque path between the section input and the section output;
a clutch device situated in a clutch torque path between the section input and the section output, the clutch torque path forming a bypass path with respect to the freewheel device and the freewheel device forming a bypass path with respect to the clutch device, the freewheel device being configured as a rotational speed-dependent freewheel device, the freewheel device being in a freewheeling state at a first rotational speed and being in a coupled state at a second rotational speed, the second rotational speed being higher than the first rotational speed,
the freewheel device including a sliding sleeve configured for being actuated between a first position in which the freewheel device is locked in the freewheeling state by the sliding sleeve and a second position in which the freewheel device is movable from the freewheeling state into the coupled state,
wherein the freewheel device includes at least one body movable between a first state for coupling a freewheel input and a freewheel output together such that the freewheel device is in the coupled state and a second state for decoupling the freewheel output from the freewheel input such that the freewheel device is in the freewheeling state,
wherein the sliding sleeve is configured for selectively holding the at least one body in the second state,
wherein the sliding sleeve protrudes into the at least one body for selectively holding the at least one body in the second state.

* * * * *